Patented Aug. 14, 1928.

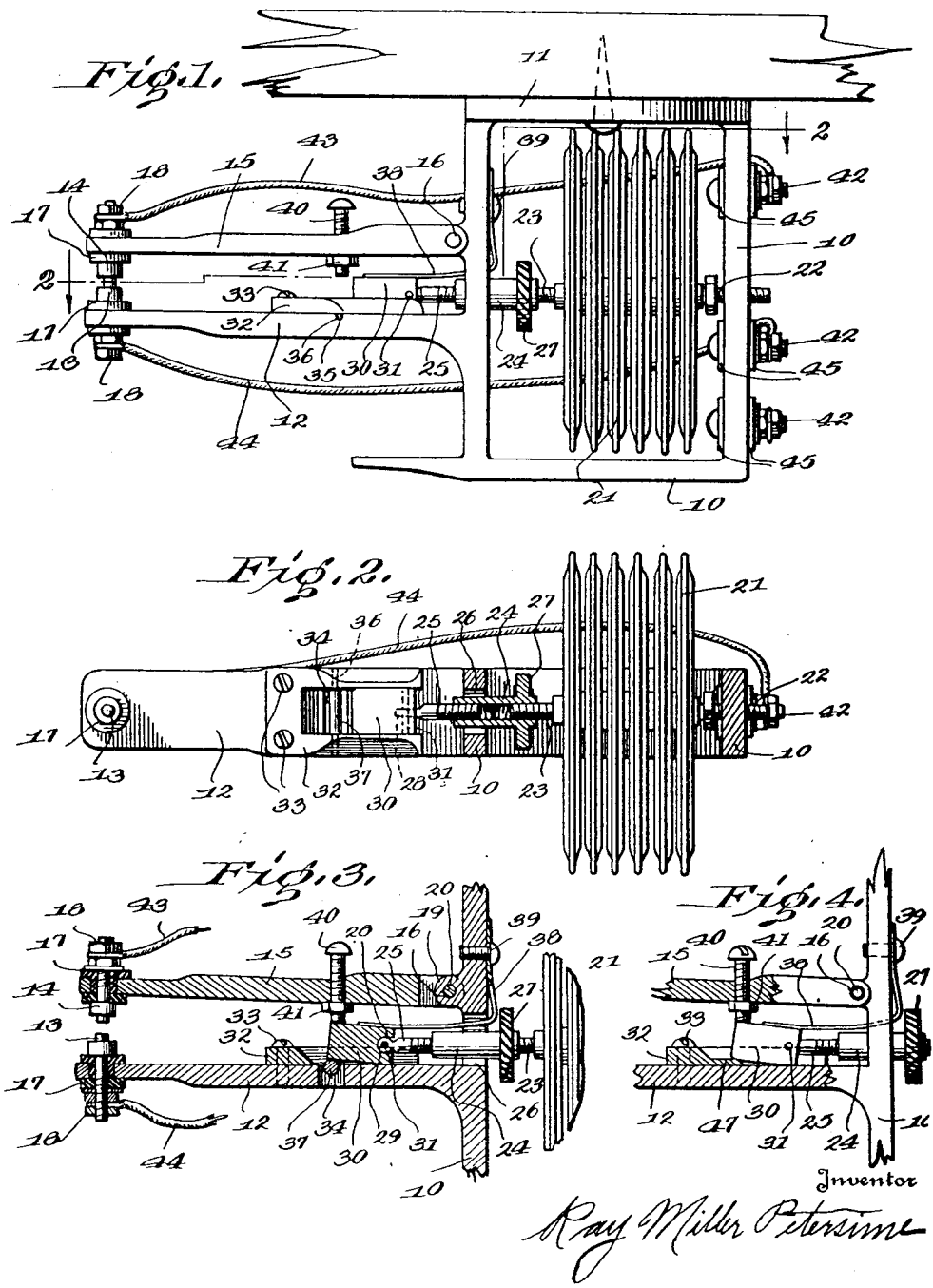

1,680,803

UNITED STATES PATENT OFFICE.

RAY MILLER PETERSIME, OF GETTYSBURG, OHIO.

REGULATOR.

Application filed December 8, 1925. Serial No. 74,202.

The present invention relates to a thermostatic controlled regulator, being more especially designed for use in incubators in order to make and break an electric circuit to a heater so as to maintain a uniform temperature at all times in the incubator, and aims to provide a novel and improved device of this character which will quickly and efficiently make and break the circuit, thus eliminating the forming of an arc between the contacts or the fusing thereof, which is very detrimental thereto.

Another object of the invention is the provision of a slidably and pivotally arranged member, the sliding movement of which is controlled by a thermostat, and the pivotal movement by an obstruction arranged in the path of said member, said member when swung on its pivotal connection being adapted to move an arm for breaking and making an electric circuit, said obstruction being arranged for suddenly swinging the member on its pivot when said member is brought into engagement therewith or moved from engagement therewith.

A further object of the invention is to provide means for adjusting the position of the slidably and pivotally arranged member with relation to the thermostat so that said member will engage or disengage the obstruction at desired temperatures, thus effecting the making and breaking of an electric circuit at the proper temperature.

It is also an object of the invention to provide a device of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a side elevation of my improved device,

Figure 2 is a horizontal section taken on line 2—2 of Figure 1,

Figure 3 is a vertical section taken through the contact arms and showing the means for making and breaking an electric circuit in section, and Figure 4 is a fragmentary elevation and section showing a slightly modified form of my invention.

In carrying out my invention, the numeral 10 designates a rectangular frame, constructed with an attaching plate 11 on its upper side, said attaching plate being provided with openings extending therethrough, for permitting screws to be passed through the same in order to secure the frame in a rigid manner to the structure the device is to be associated with. Extending from one side of the frame 10 in a horizontal manner is an arm 12, which has attached to its outer extremity a contact 13, which is adapted to engage another contact 14 carried by an arm 15 pivotally connected to the frame 10, as at 16. The contacts 13 and 14 are insulated from the arms 12 and 15 respectively, as at 17, and are provided with binding nuts 18 for attaching wires to said contacts. The pivotal connection of the arm 15 with the frame 10 is constructed by forking the arm so that the sides of said forked portion lie on the sides of a lug 19 carried by the frame 10 and the passing of a pin 20 through said forked sides of the arm 15 and through said lug.

Positioned in the frame 10 is a thermostat 21, of wafer formation, said thermostat being connected to the frame 10 by an adjusting screw 22 which passes through the frame. By turning the screw 22, the position of the thermostat within the frame may be adjusted. On the opposite side of the thermostat is provided a screw threaded extension 23 which is threaded into one end of an adjusting collar 24, said collar 24 having threaded in the opposite end thereof a pin 25, the threads in the opposite ends of the collar 24 and on the pin 25 and extension 23 are in the opposite direction, so that turning movement of the collar 24 will either move the pin 25 and extension 23 towards each other or away from each other. The collar 24 has one end thereof extended through an opening 26 arranged in the frame and adjacent the stationary arm 12, and has provided thereon a finger engaging disk 27 which has the periphery thereof serrated so that the collar 25 may be easily turned or rotated.

The pin 25 has the end thereof not received in the collar 24 flattened, as at 28, and has said flattened portion received in a recess 29 provided in a block 30, said flattened portion 28 being secured to the block 30 by the passing of a pin 31 through said block and flattened portion, so as to pivotally connect the block 30 to the pin 25.

From the foregoing, it can be seen that when the thermostat expands or contracts, due to a change of temperature, that the block 30 will be slid on the upper face of the arm 12, the sliding movement of the block being guided by a U-shaped plate 32 secured to the upper face of the stationary arm 12 by means of screws 33, or the like, said U-shaped plate having the opposite parallel side portions thereof arranged for engaging the opposite sides of the block 30. Arranged in the stationary arm 12 and extending therethrough is an opening 34 and a pair of grooves 35 provided in the upper face thereof, said grooves being arranged at each side of the opening 34. The grooves 35 are adapted to receive trunnions 36 carried on the opposite ends of a roller 37, said roller 37 being of sufficient size so as to project slightly above the upper surface of the arm 12. The side portions of the U-shaped plate 32 engage over the trunnions 36 of the roller and hold said trunnions 36 in the grooves 35, thus supporting the roller 37 for rotary movement in the opening 34. A leaf spring 38 of angled configuration has one angled portion thereof secured to the inner face of the side of the frame 10 to which the contact arms are carried by means of a screw 39, while the other angled portion thereof extends through the opening 26 provided in the frame and has its extremity in contacting engagement with the upper surface of the slidably mounted block 30, said spring being arranged for yieldably holding the block 30 in a downward position in engagement with the upper face of the stationary arm 12. Threaded through the pivotally connected arm 15 is a screw 40 which is arranged slightly nearer the frame 10 than the roller 37, said pin being adjustable upon the arm 15 by turning the same and being held in an adjusted position by means of a lock nut 41.

On the side of the frame 10 opposite to that supporting the arms 12 and 15 are provided a series of terminals 42, two of which are adapted to be connected to the contacts 13 and 14 by means of wires 43 and 44, said terminals being insulated from the frame by means of insulation members 45. It will be noted that certain wires may be attached to the terminals 42 so as to control the supply of current to a heater, or the like, said supply of current being made and broken by the operation of the thermostat 21.

In operation, the contacts 13 and 14 are normally in engagement with each other, thus permitting current to flow to the device to be regulated. As the heat or temperature increases about the thermostat 21, the same expands, thus sliding the block 30 outwardly upon the stationary arm 12, the spring 38 holding said block in engagement with the upper surface of said arm. As the block continues to move outwardly due to the temperature about the thermostat, the same moves slightly under the adjusting screw 40 carried by the arm 15, and then engages the roller 37, which forms an obstruction in the path of the block 30. The block 30 in order to pass the roller 37 is suddenly forced upwardly, swinging the block 30 on its pivotal connection with the pin 25, thus causing the block 30 to engage the adjusting screw 40 and force the pivotally connected arm 15 upwardly, separating the contact 14 from the stationary contact 13, which will break the circuit. After the circuit is broken and the heater cut off, the temperature around the thermostat will decrease or lower, which will cause the thermostat to contract, drawing the block 30 inwardly until the same is out of engagement with the roller 37, which will allow the arm 15 to return to its normal position with the contact 14 in engagement with the contact 13, thus permitting current to again flow to the heater. By turning the collar 24, the block may be adjusted so as to engage and disengage the roller 37 at different temperatures. It is to be noted that when the block 30 is moved to engagement with the roller 37 that the sliding movement thereof is momentarily retarded, due to the spring 38 yieldably holding said block downwardly in engagement with the upper face of the arm 12, and that as the heat around the thermostat continues to increase, the forward pressure of the block 30 is increased until sufficient to overcome the approximately flat engaging portion of the block with the roller so as to suddenly force the forward end of the block 30 upwardly against tension of the spring 38, thus providing a structure which will quickly disengage or engage the contacts so as to eliminate to a great extent the forming of an arc between said contacts which tends to destroy the faces thereof by pitting the same.

In Figure 4 of the official drawings, I have shown a modified form of the invention wherein the roller 37 is eliminated and the obstruction for engaging the block 30 is provided by extending from the bight portion of the U-shaped plate a small lip 47, which will serve the same purpose as the roller. By constructing the obstruction as shown in this figure, friction is increased between the same and the block 30 so as to retard forward movement of the block 30 to a greater extent when brought into engagement with the obstruction, which will cause a very sudden upward movement of the forward end of the block 30, thus quickly breaking the circuit at the contacts 13 and 14. Although I have shown the obstruction 47 as being formed on the U-shaped plate 32, it is to be understood that the obstruction may be formed in any desired manner, and may be, if found practical, formed with the stationary arm 12.

Having thus described my invention, what I claim as new is:

1. A regulator comprising a stationary arm, a movable arm, contacts arranged on said arms, a slidable member, means for automatically sliding said member, and means arranged in the path of said slidable member for forcing the same into and out of engagement with said movable arm for separating said contacts when engaging said means and for permitting engagement of said contacts when disengaging said means.

2. A regulator comprising a stationary arm, a movable arm, contacts arranged upon said arms, a thermostat, a member adapted to be moved by said thermostat, and means arranged in the path of said movable member for moving said movable arm away from said stationary arm for disengaging said contacts or for permitting said movable arm to move towards said stationary arm for engaging said contacts.

3. A regulator comprising a stationary arm, a movable arm, contacts arranged upon said arms, a thermostat, a member adapted to be moved by said thermostat, and means arranged in the path of said movable member for forcing the same into engagement with said movable arm so as to move the same for engaging or disengaging said contacts.

4. A regulator comprising a stationary arm, a movable arm, contacts arranged upon said arms, a thermostat, a member adapted to be moved by said thermostat, means arranged in the path of said movable member for forcing the same into and out of engagement with said movable arm in order to move the same to engage or disengage said contacts, and means for adjusting the position of said movable member with relation to said thermostat for controlling the making and breaking of said contacts at the desired temperature around said thermostat.

5. A regulator comprising a stationary arm, a movable arm, contacts arranged upon said arms, a member slidably mounted upon one of said arms, and means arranged in the path of said slidable member for forcing the same away from the arm said member is slidably mounted on and into engagement with the other arm for separating said arms and disengaging said contacts.

6. A regulator comprising a stationary arm, a movable arm, contacts arranged on said arms, a member slidably mounted on said stationary arm, a thermostat arranged for sliding said member, and means arranged upon said stationary arm and in the path of said slidable member for forcing said slidable member into and out of engagement with said movable arm for disengaging and engaging said contacts.

7. A regulator comprising a stationary arm, a movable arm, contacts arranged upon said arms, a member slidably mounted on said stationary arm, a thermostat attached to said member and arranged for moving the same, and an obstruction carried by said stationary arm and arranged in the path of movement of said slidable member for forcing the same into and out of engagement with the movable member for making and breaking a circuit through said contacts.

8. A regulator comprising a stationary arm, a movable arm, contacts arranged upon said arms, a member arranged between said arms and normally engaging said stationary arm, a thermostat, means carried by said thermostat for pivotally connecting the same to said member arranged upon said stationary arm, and means arranged in the path of said member when moved by said thermostat for forcing the forward end thereof upwardly and into engagement with said movable arm for forcing the same upwardly in order to break said contacts.

9. A regulator comprising a stationary arm, a movable arm, contacts arranged upon said arms, a member arranged between said arms and normally engaging said stationary arm, a thermostat, means carried by said thermostat for pivotally connecting the same to said member arranged upon said stationary arm, means arranged in the path of said member when moved by said thermostat for forcing the forward end thereof upwardly and into engagement with said movable arm for forcing the same upwardly in order to break said contacts, and spring means for normally holding said movable member into engagement with said stationary arm.

10. A regulator comprising a stationary arm, a movable arm, contacts arranged upon said arms, a thermostat, a member pivotally connected at the rear end thereof to said thermostat and arranged between said arms, the weight of said member aiding in normally holding said member into engagement with said stationary arm, and an obstruction arranged in the path of said movable member for forcing the forward end thereof upwardly and into engagement with said movable arm for separating said contacts.

11. A regulator comprising a stationary arm, a movable arm, contacts arranged on said arms, a thermostat, a member pivotally connected to said thermostat and normally engaging said stationary arm, spring means for normally holding said movable member in engagement with said stationary arm, a guide plate arranged upon said stationary arm for guiding the path of movement of said movable member, means arranged in the path of said movable member for forcing the forward end thereof upwardly against tension of said spring means and into engagement with said movable arm for separating said contacts.

12. A regulator comprising a stationary arm, a movable arm, contacts arranged upon said arms, a thermostat, a member pivotally connected to said thermostat, means for adjusting the position of said member towards or away from said thermostat, spring means for normally holding said member in engagement with one of said arms, and means arranged in the path of movement of said movable member for forcing the forward end thereof against tension of said spring and into engagement with the other arm for separating said contacts.

13. A regulator comprising a stationary arm, a movable arm, contacts arranged upon said arms, a thermostat, a member carried by said thermostat and slidably arranged upon one of said arms, a roller arranged in the path of movement of said movable member and being adapted to force said movable member into engagement with the other of said arms for separating said contacts.

14. A regulator comprising a stationary arm, a movable arm, contacts arranged upon said arms, a thermostat, a member adapted to be moved by said thermostat, and a roller arranged in the path of said movable member for forcing the same into engagement with one of said arms for disengaging said contacts.

15. A regulator comprising a stationary arm, a movable arm, contacts arranged upon said arms, a thermostat, a member adapted to be moved by said thermostat, a roller arranged in the path of said movable member for forcing the same into engagement with one of said arms for disengaging said contacts, and spring means for forcing said movable member out of engagement with the arm after said movable member has disengaged said roller on return movement for engaging said contacts.

16. A regulator comprising a stationary arm, a movable arm, contacts arranged on said arms, a thermostat, a member adapted to be moved by said thermostat, means arranged in the path of movement of said movable member, adjustable means carried by one of said arms and being adapted to be engaged by said movable member when the same engages the means arranged in the path thereof for separating said arms and disengaging said contacts.

17. A regulator comprising a stationary arm, a movable arm, a slidable member, means for automatically sliding said member, spring means for normally holding said slidable member in engagement with one of said arms, a roller arranged in the path of movement of said slidable member, a depending member carried by one of said arms and being adapted to be engaged by said slidable member when the same engages said roller for separating said arms and disengaging said contacts.

18. A regulator comprising a frame, a stationary arm arranged on said frame, another arm pivotally connected to said frame, a thermostat arranged in said frame, a member slidably mounted upon said stationary arm and adapted to be moved by said thermostat, contacts arranged upon said arms and adapted to normally engage each other, and means arranged on said stationary arm and in the path of said slidable member for forcing the same upwardly and into engagement with said pivotally mounted arms for disengaging said contacts.

19. A regulator comprising a frame, a stationary arm arranged on said frame, another arm pivotally connected to said frame, a thermostat arranged in said frame, a member slidably mounted upon said stationary arm and adapted to be moved by said thermostat, contacts arranged upon said arms and adapted to normally engage each other, means arranged on said stationary arm and in the path of said slidable member for forcing the same upwardly and into engagement with said pivotally mounted arms for disengaging said contacts, and spring means engaging said slidable member for moving the same out of engagement with said pivotally mounted arm after said slidable member has disengaged said means arranged in the path thereof for permitting said contacts to engage.

20. A regulator comprising a frame, a stationary arm arranged on said frame and extending therefrom, another arm pivotally connected to said stationary arm and arranged thereabove, a thermostat, a member arranged upon said stationary arm and being pivotally connected to said thermostat so as to be slid upon said arm upon movement of said thermostat, means arranged in the path of movement of said slidable member for forcing the forward end thereof upwardly and into engagement with said pivotally mounted arm for disengaging said contacts upon forward movement of said slidable member, and spring means arranged for normally holding said slidable member into engagement with said stationary member and for returning said stationary member out of engagement with said pivotally mounted arm after said stationary member has been disengaged from said means arranged in the path thereof.

In testimony whereof, I have affixed my signature.

RAY MILLER PETERSIME.